Figure 8:
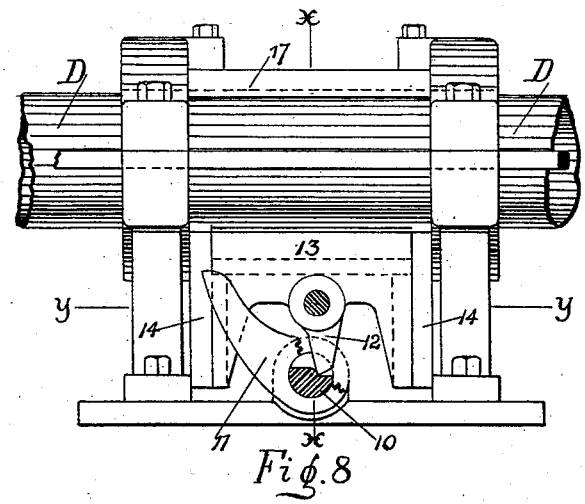

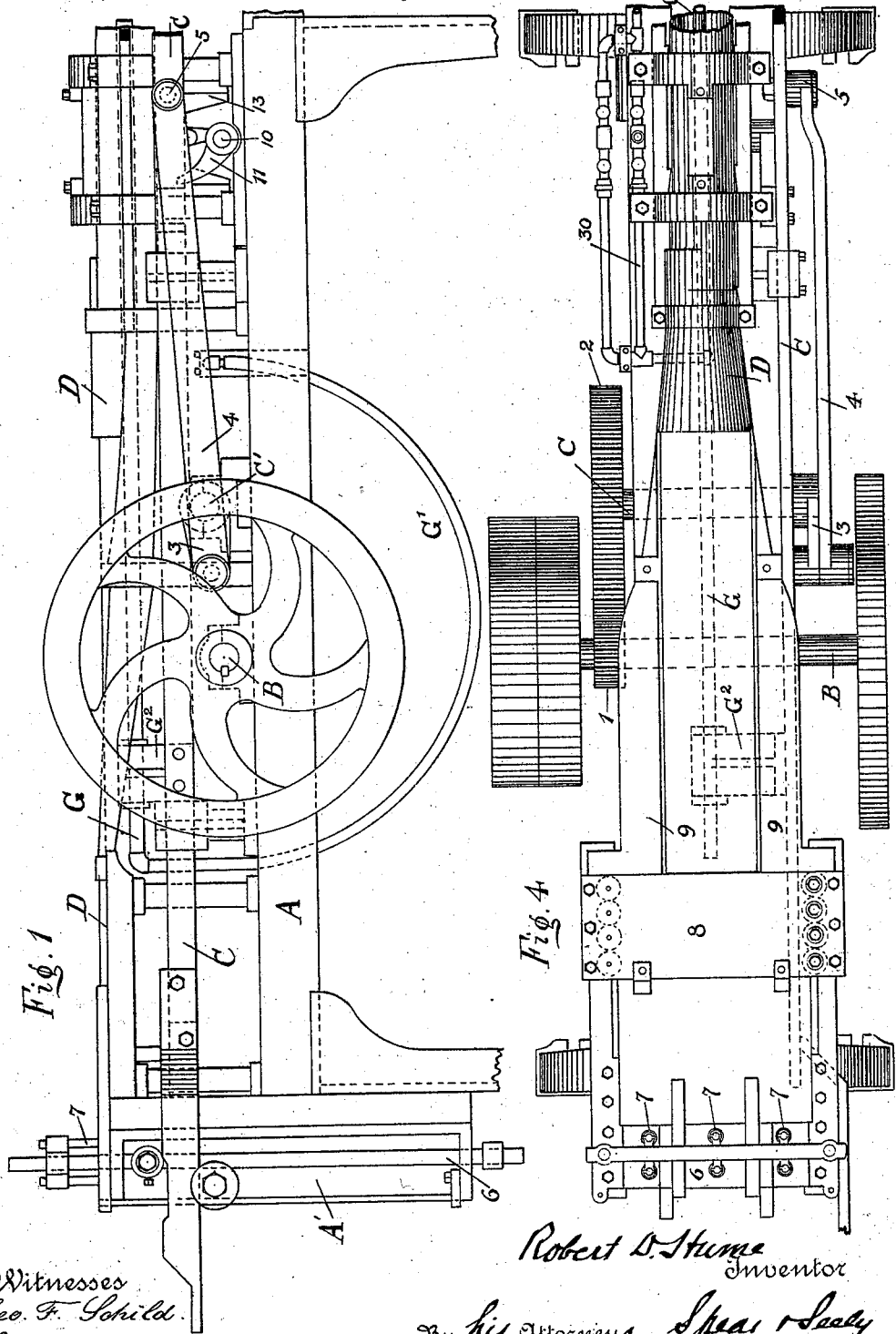

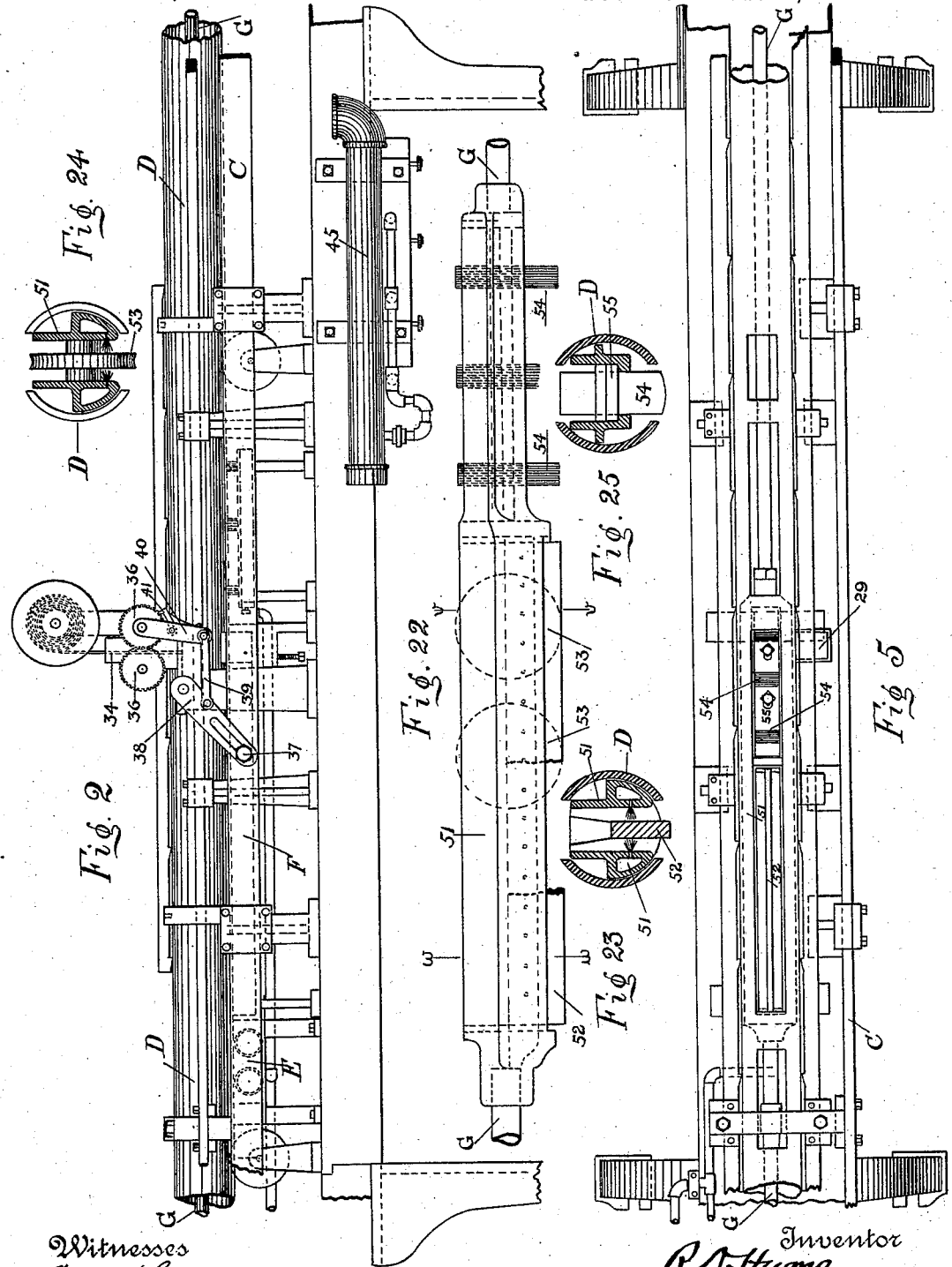

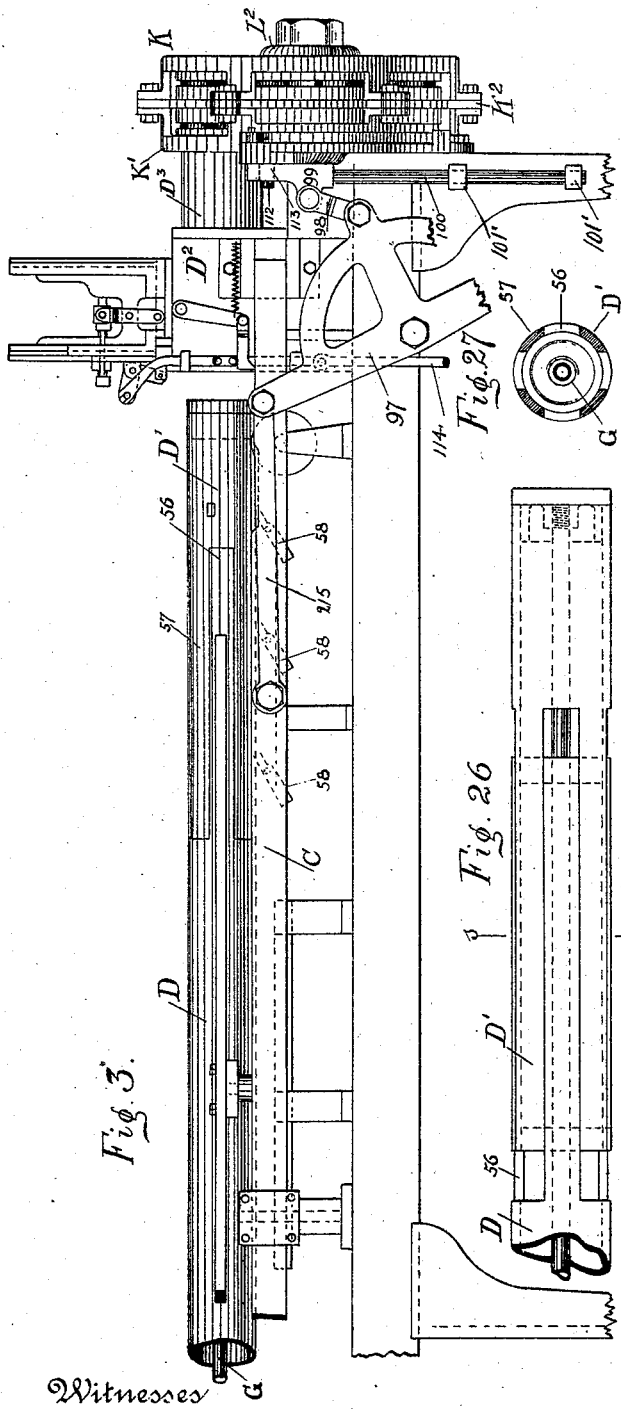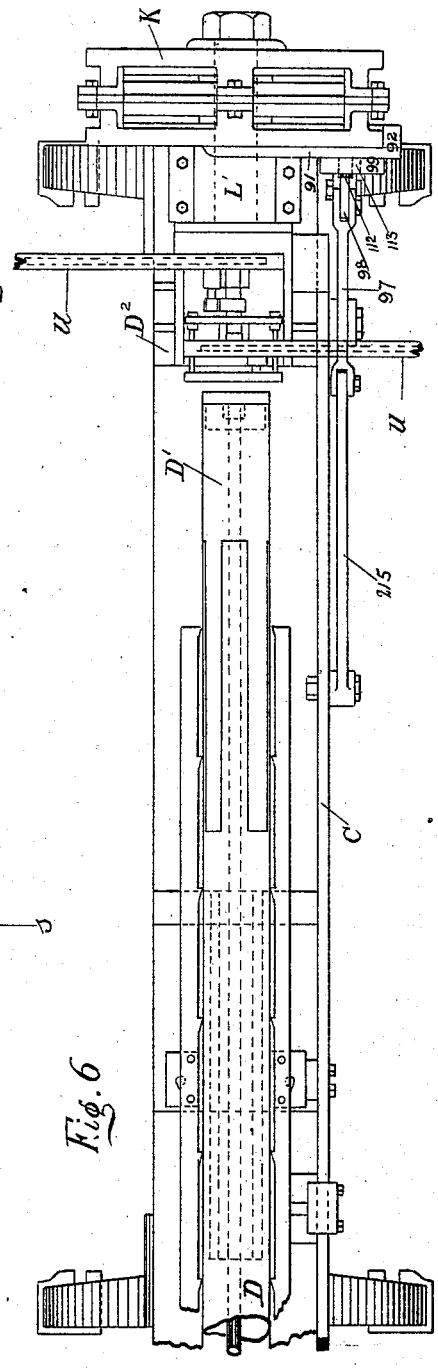

(No Model.)  14 Sheets—Sheet 4.
R. D. HUME.
CAN MAKING MACHINERY.
No. 576,120. Patented Feb. 2, 1897.
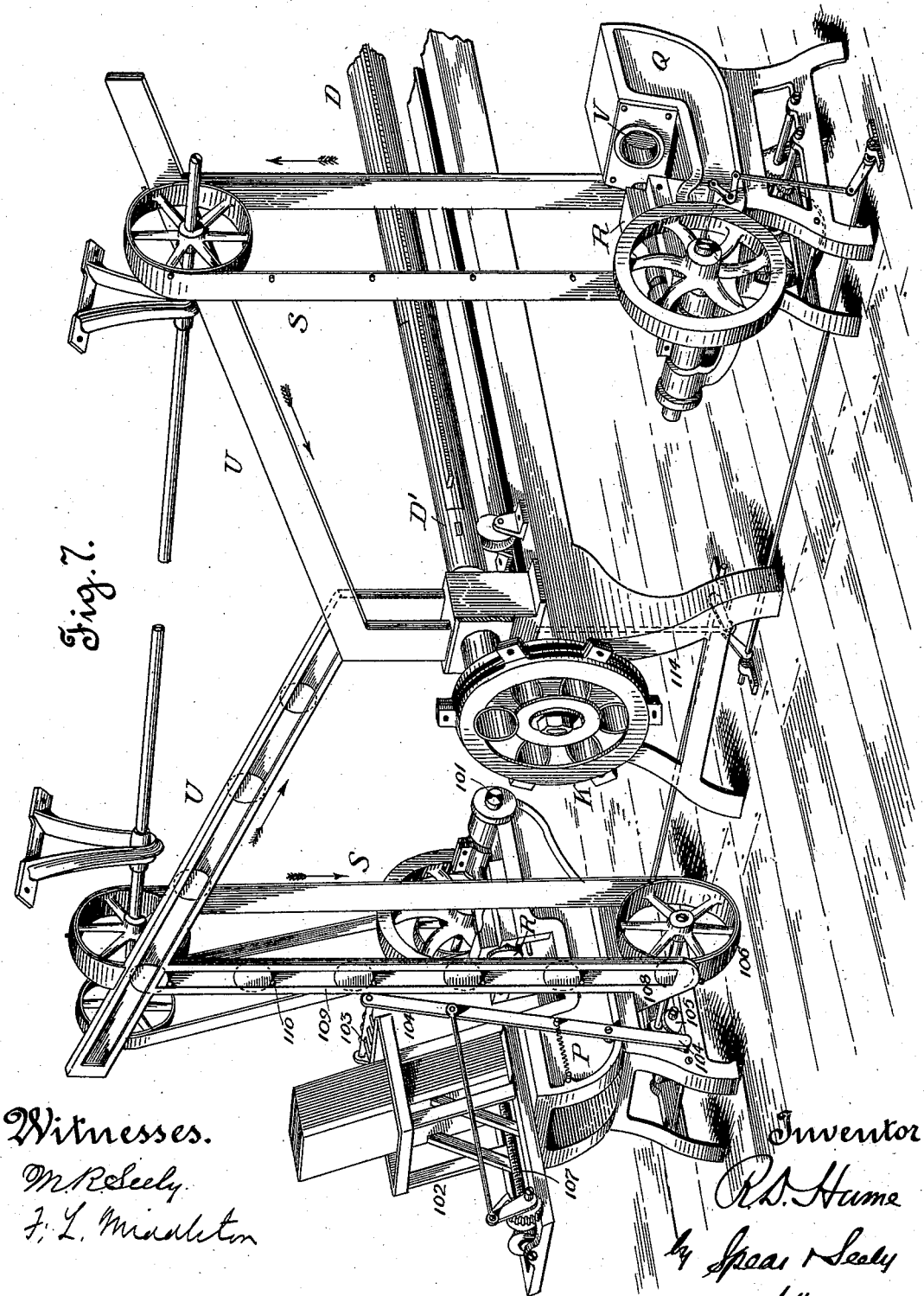

(No Model.) 14 Sheets—Sheet 5.

R. D. HUME.
CAN MAKING MACHINERY.

No. 576,120. Patented Feb. 2, 1897.

Witnesses
Geo. F. Schild.
M. R. Seely

R. D. Hume
Inventor

By his Attorneys
Spear & Seely (No Model.)  14 Sheets—Sheet 6.
R. D. HUME.
CAN MAKING MACHINERY.
No. 576,120. Patented Feb. 2, 1897.
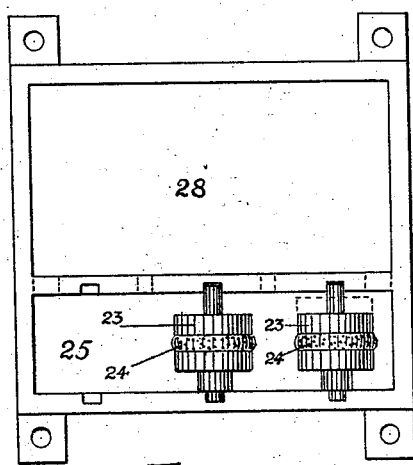
Fig. 13
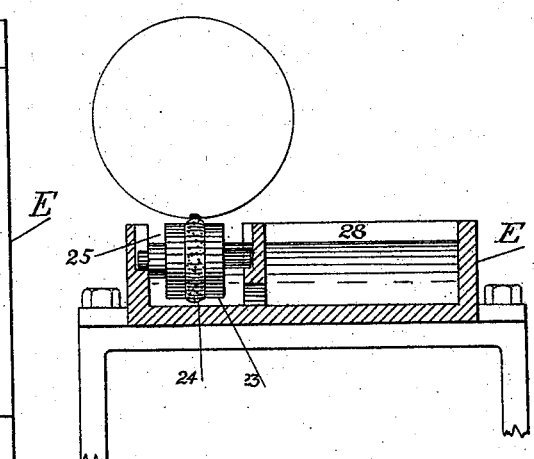
Fig. 14
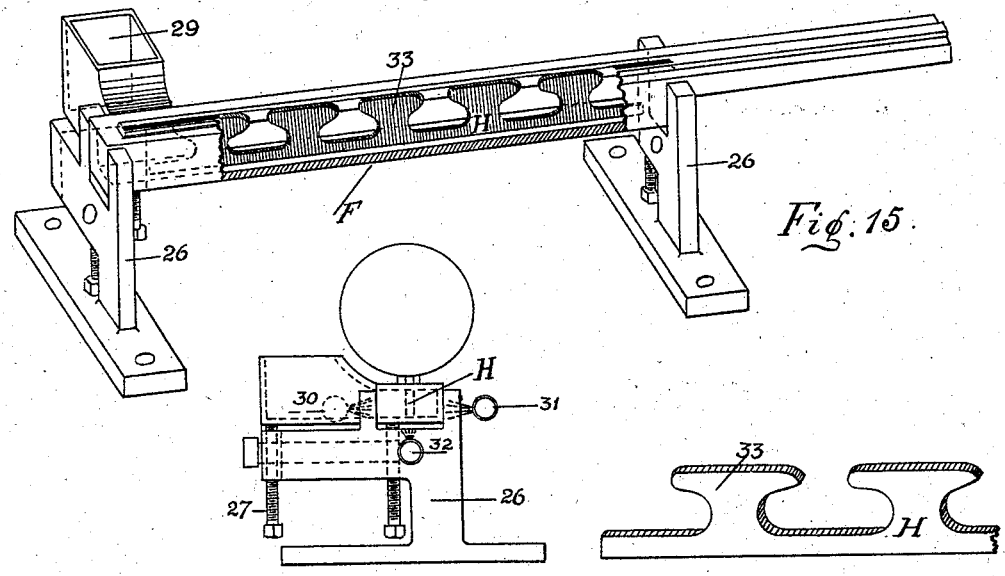
Fig. 15
Fig. 16
Fig. 17
Witnesses
Geo. F. Schild.
M. R. Seely
R. D. Hume Inventor
By his Attorneys Spear & Seely

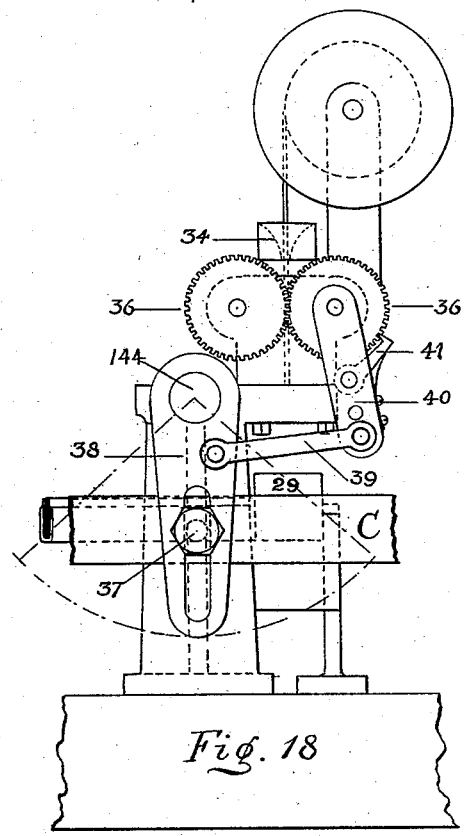
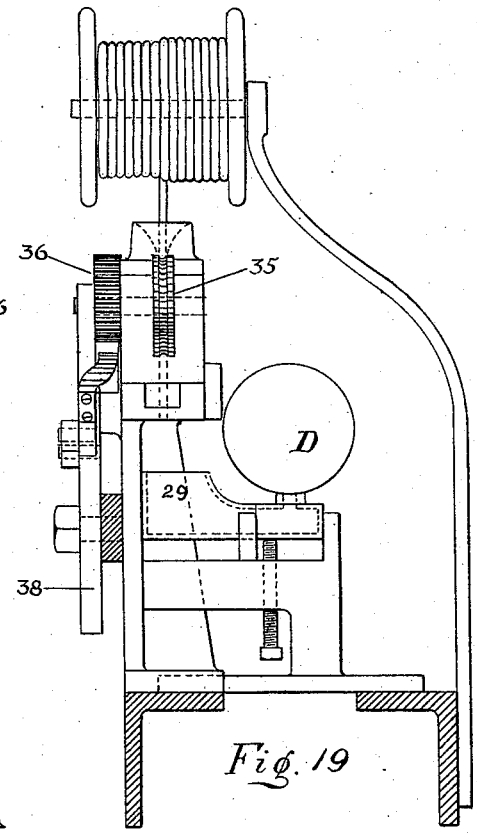
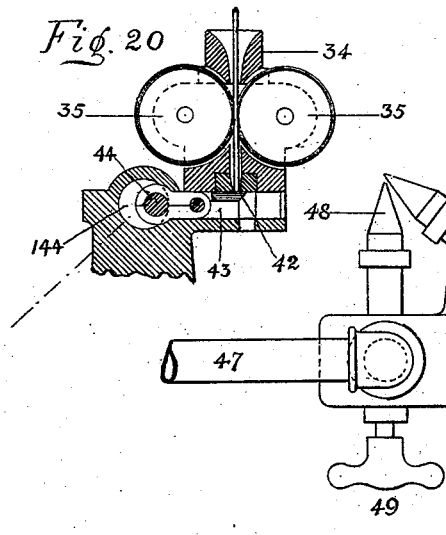
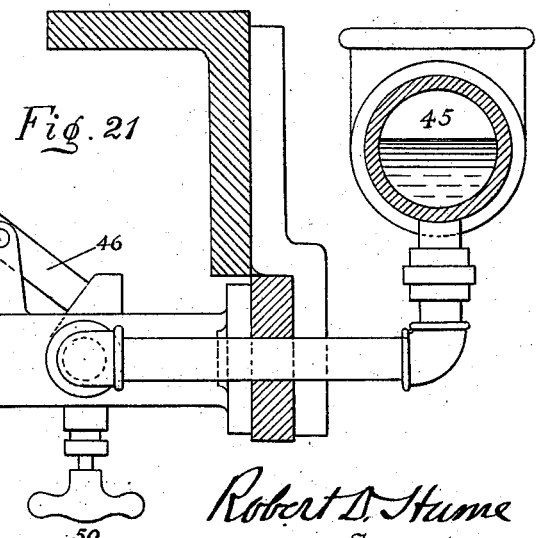

(No Model.) 14 Sheets—Sheet 8.

R. D. HUME.
CAN MAKING MACHINERY.

No. 576,120. Patented Feb. 2, 1897.

Witnesses
Geo. F. Schild.
M. R. Seely

Inventor
R. D. Hume
By his Attorneys
Spear & Seely (No Model.) 14 Sheets—Sheet 9.

R. D. HUME.
CAN MAKING MACHINERY.

No. 576,120. Patented Feb. 2, 1897.

Witnesses
Geo. F. Schild.
M. R. Seely.

Robert D. Hume
Inventor
By his Attorneys
Spear & Seely

THE NORRIS PETERS CO., PHOTO-LITHO., WASHINGTON, D. C.

(No Model.) 14 Sheets—Sheet 10.
R. D. HUME.
CAN MAKING MACHINERY.

No. 576,120. Patented Feb. 2, 1897.

Witnesses
Geo. F. Schild.
M. R. Seely.

Robert D. Hume
Inventor

By his Attorneys
Spear & Seely (No Model.) 14 Sheets—Sheet 11.

R. D. HUME.
CAN MAKING MACHINERY.

No. 576,120. Patented Feb. 2, 1897.

Witnesses
Geo. F. Schild
M. R. Seely

Robert D. Hume
Inventor
By his Attorneys
Spear & Seely (No Model.)   14 Sheets—Sheet 12.

R. D. HUME.
CAN MAKING MACHINERY.

No. 576,120.   Patented Feb. 2, 1897.

Witnesses:
Geo. F. Schild
M. R. Seely

Robert D. Hume
Inventor
by Spear & Seely
Attorneys

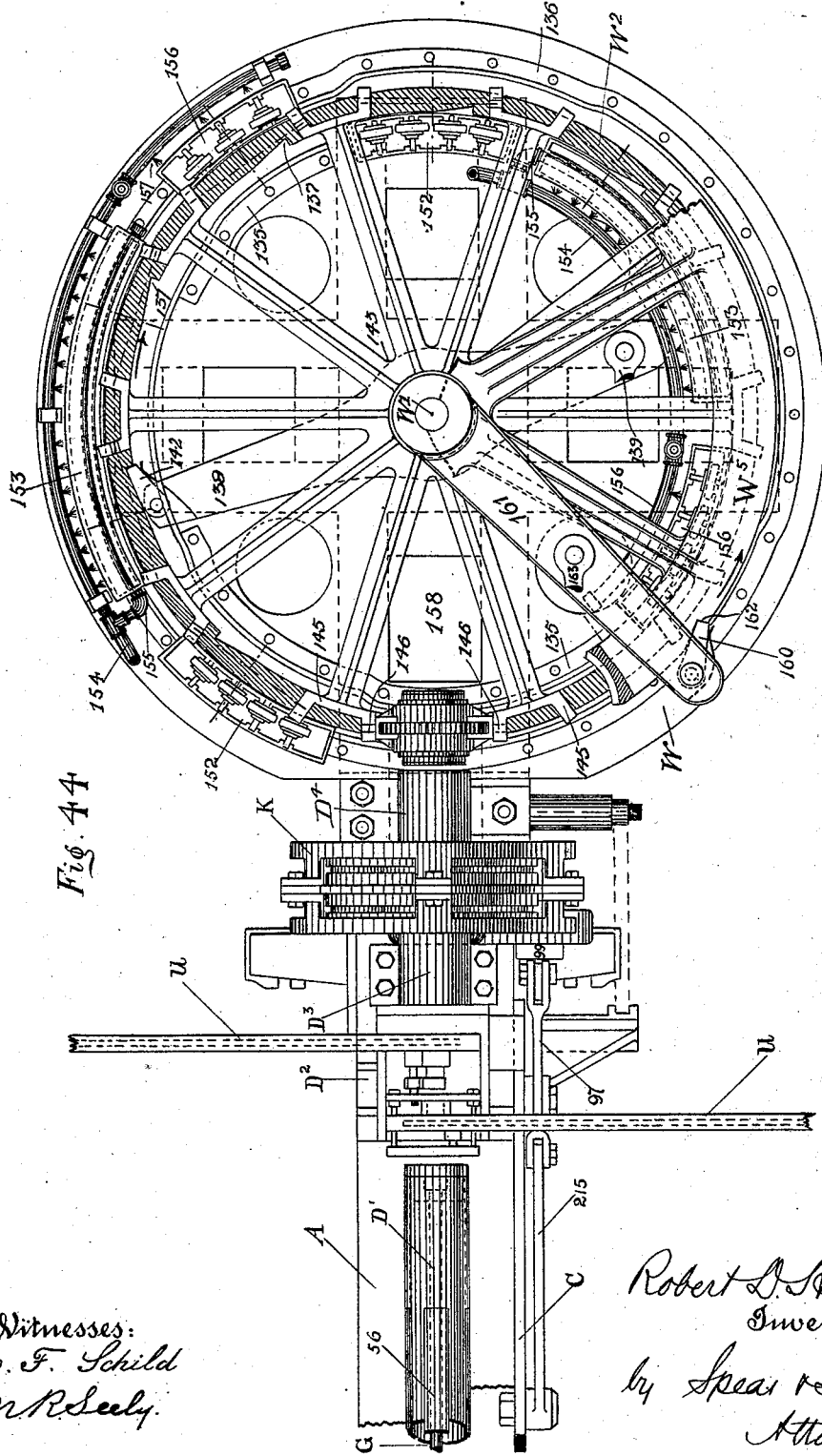

(No Model.) 14 Sheets—Sheet 14.

R. D. HUME.
CAN MAKING MACHINERY.

No. 576,120. Patented Feb. 2, 1897.

Witnesses:
Geo. F. Schild
M. R. Seely

Robert D. Hume
Inventor.
by Spear & Seely
Attorneys

UNITED STATES PATENT OFFICE.

ROBERT D. HUME, OF GOLD BEACH, OREGON.

CAN-MAKING MACHINERY.

SPECIFICATION forming part of Letters Patent No. 576,120, dated February 2, 1897.

Application filed December 1, 1894. Serial No. 530,590. (No model.)

*To all whom it may concern:*

Be it known that I, ROBERT D. HUME, a citizen of the United States, residing at Gold Beach, in the county of Curry and State of Oregon, have invented certain new and useful Improvements in Can-Making Machinery; and I do hereby declare that the following is a full, clear, and exact description thereof.

My invention relates to automatic machinery for making sheet-metal cans; and the object of my invention is to produce a self-feeding machine which by a connected mechanism will form the can-bodies, make and lock the interlocking hooked edges of the side seam, close the seam, solder the seam within and without, feed sheets of metal for can-heads, press the blanks made from such sheets into can-heads, feed both can-heads into position at the ends of the can-body and in line with it, secure both heads upon the can-body, and solder either or both heads to the body. Such a machine, it will be seen, is completely automatic, it being only necessary to maintain a proper supply of can-body blanks and can-head blanks.

So far as I am aware I am the first to provide a single continuous mechanism which not only forms the can-bodies ready for heading, but also forms the can-heads and secures such heads to the open ends of the body, the result being that complete cans are made from ordinary flat blanks by a single process and are discharged from the machine rapidly and continuously.

My invention will be fully understood from the following detailed description, which should be read in connection with the accompanying drawings, and it should be stated that the first three sheets of the drawings and the twelfth sheet should be read together endwise, the elevations there shown and the plan views corresponding being intended to represent the complete machine, as if shown in single figures.

Figure 9:
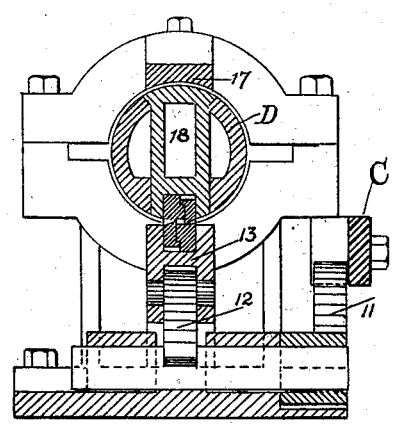
Figure 10:
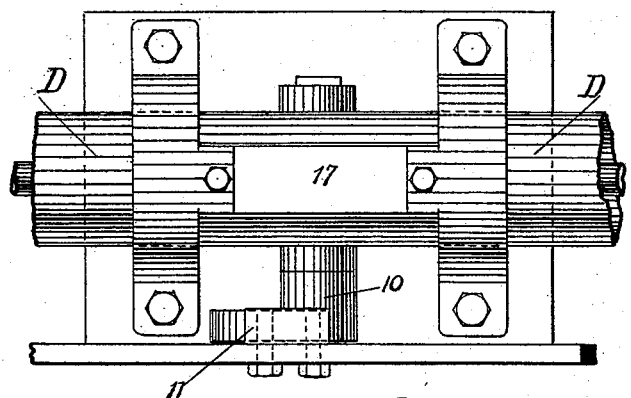
Figure 11:
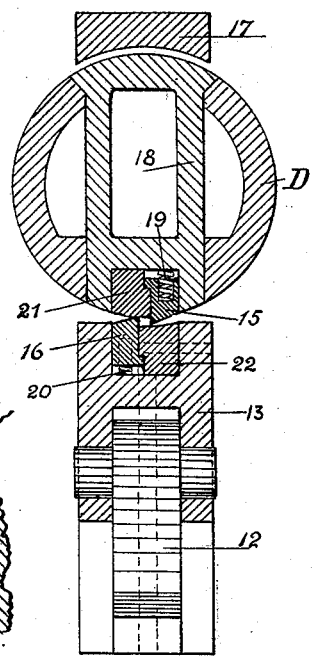
Figure 12:
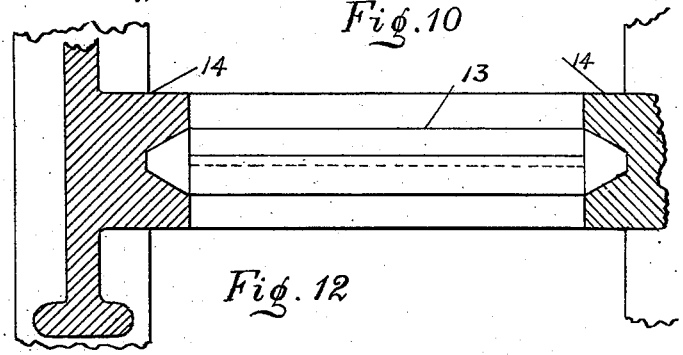
Figure 28:
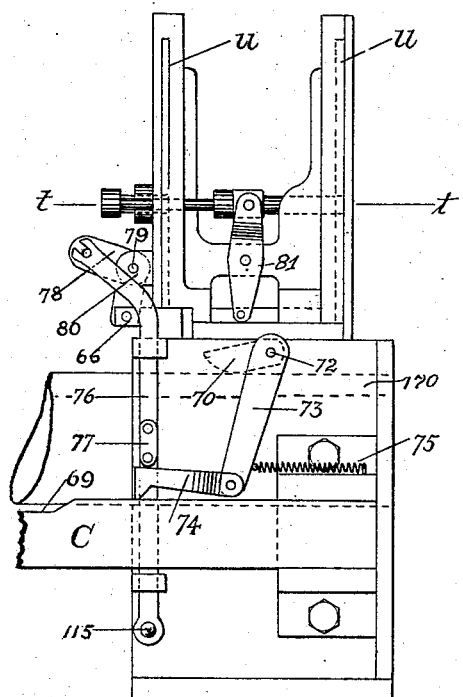
Figure 29:
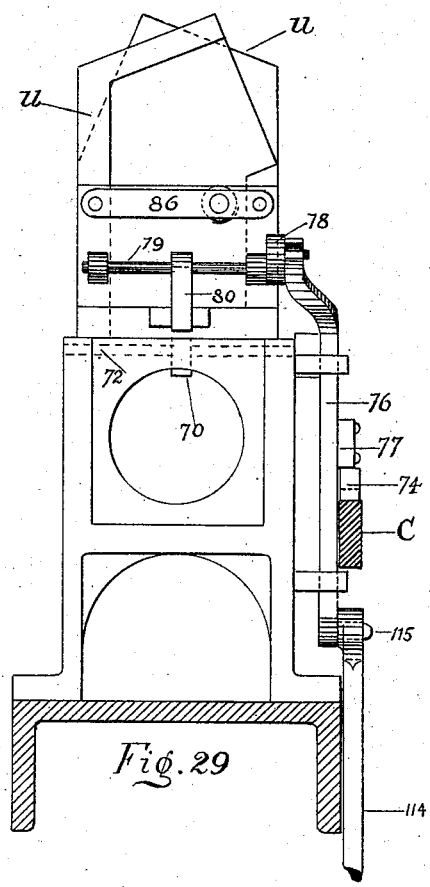
Figure 30:
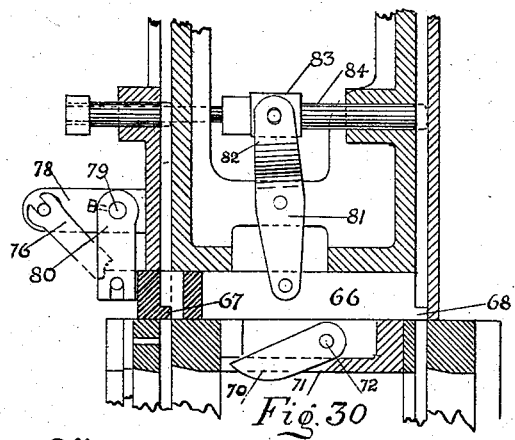
Figure 31:
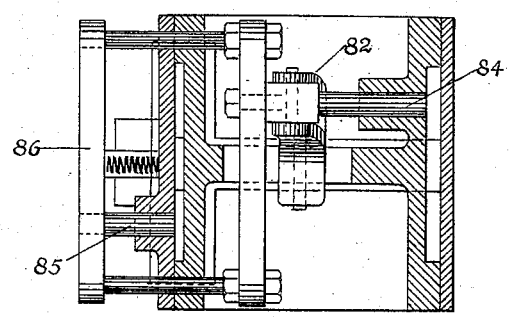
Figure 32:
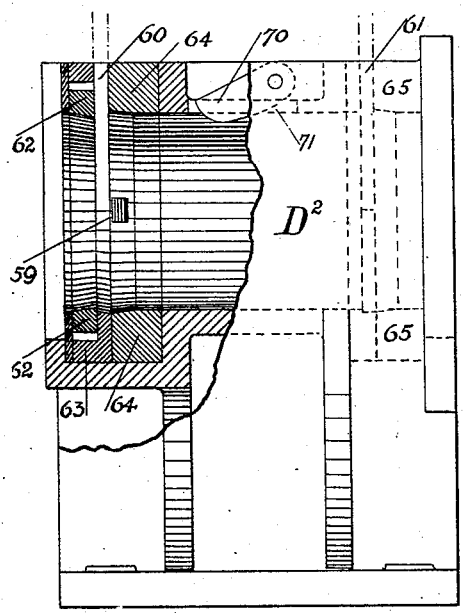
Figure 33:
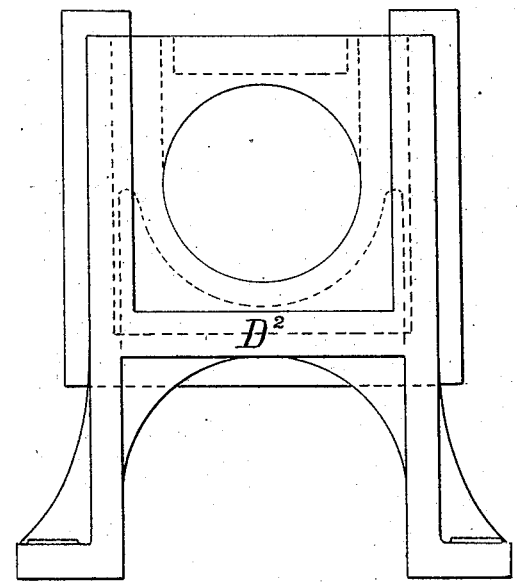
Figure 34:
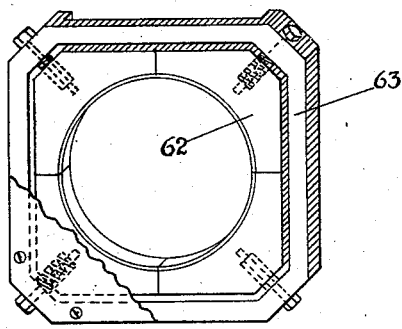
Figure 35:
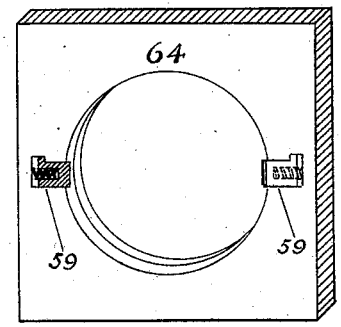
Figure 36:
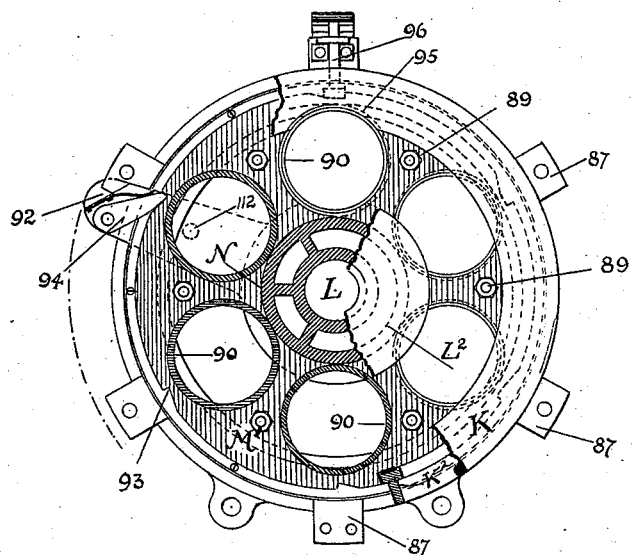
Figure 37:
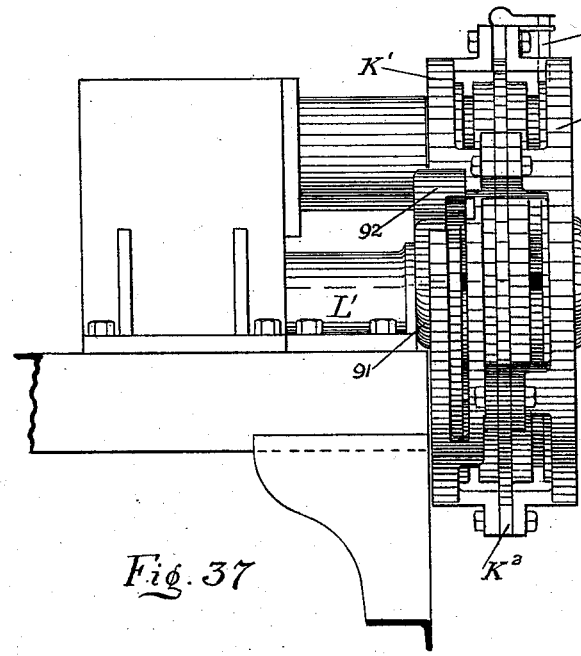
Figure 38:
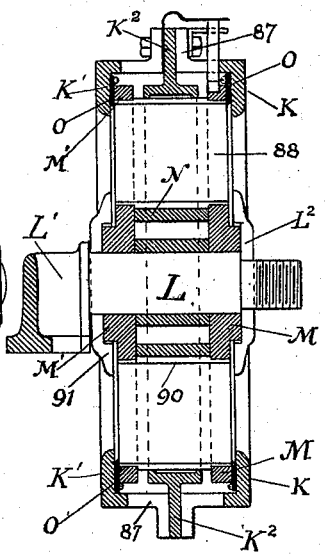
Figure 39:
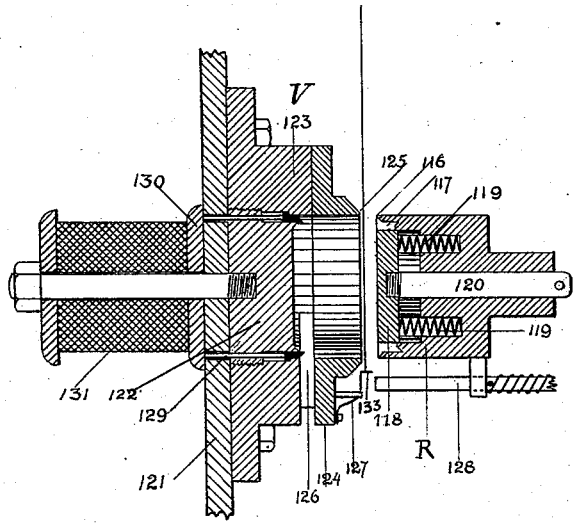
Figure 40:
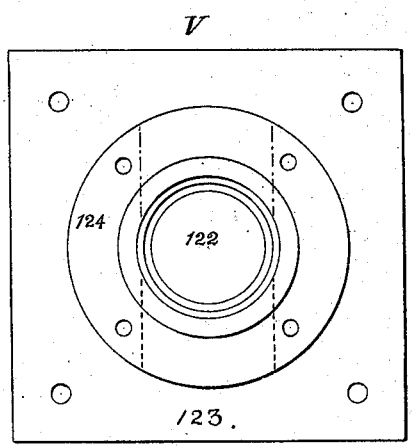
Figure 41:
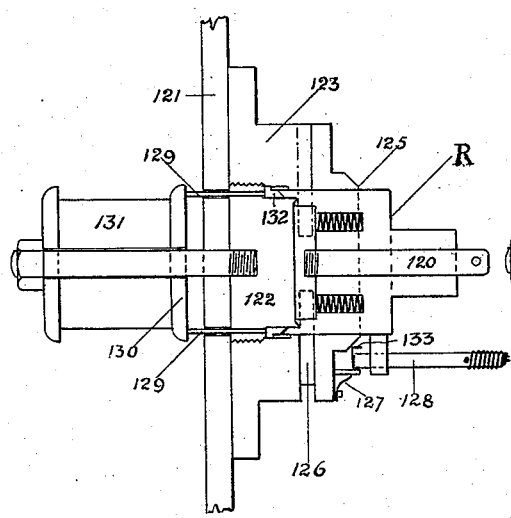
Figure 42:
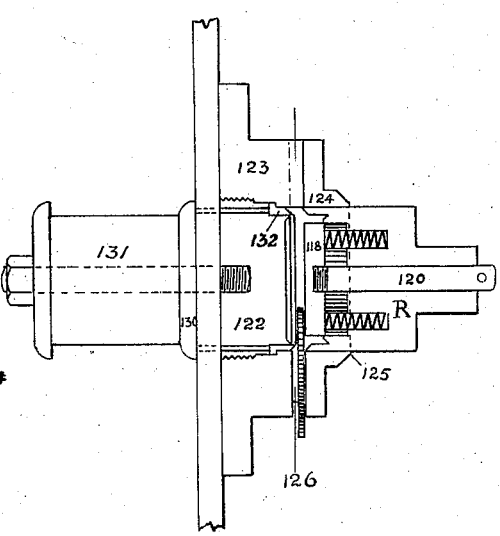
Figure 45:
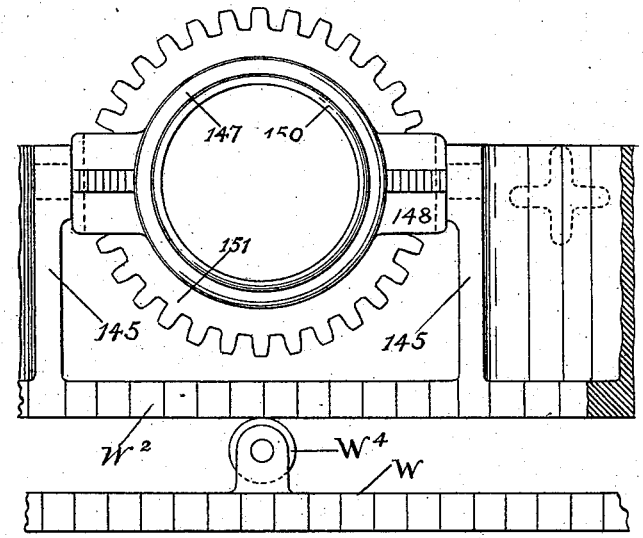
Figure 46:
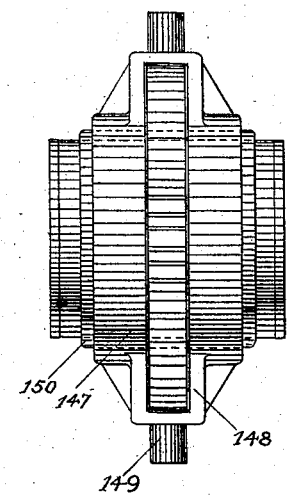
Figure 47:
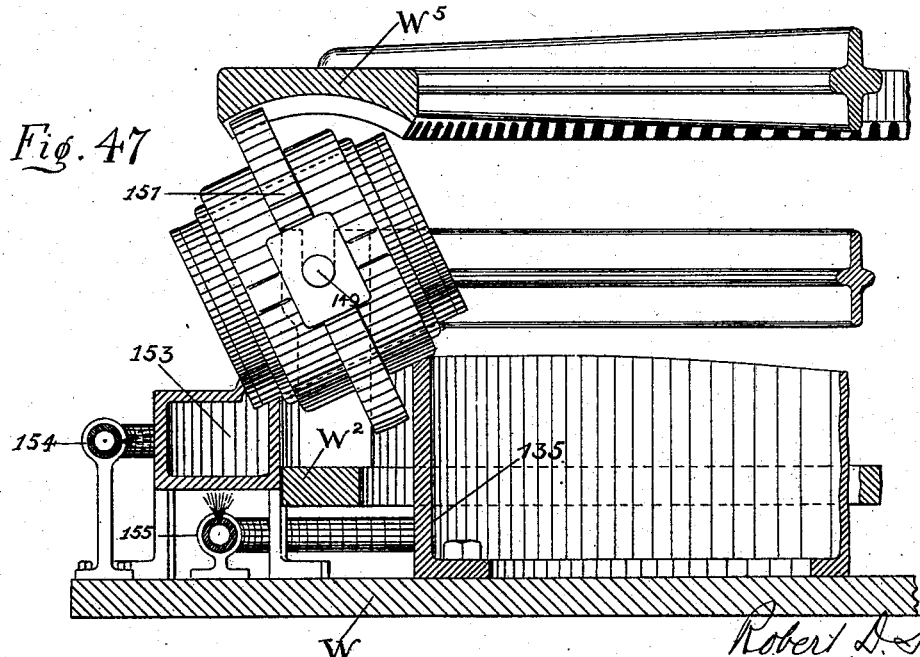

In the drawings, Figures 1, 2, and 3, on different sheets, are side elevations, which represent, when taken together, the machine as a whole, excepting the feeding devices and presses for the can-heads. Figs. 4, 5, and 6, on different sheets, are plan views of the same. Fig. 7 is a perspective view of the front end the machine, showing the two presses and the feeding devices for the can-heads. Fig. 8 is a side elevation of the seam-closing mechanism. Fig. 9 is a cross-section of the same on the line $xx$, Fig. 8. Fig. 10 is a plan of the same. Fig. 11 is an enlarged section on line $xx$, Fig. 8, showing the details of the dies shown in Fig. 9. Fig. 12 is a section on line $yy$, Fig. 8. Fig. 13 is a plan of the acid-tank. Fig. 14 is a section through the same. Fig. 15 is a perspective view of the soldering-tank partly broken away to show the soldering-iron. Fig. 16 is a front elevation of the same. Fig. 17 is an enlarged section of part of the soldering-iron. Fig. 18 is a side elevation of the solder-feeding mechanism. Fig. 19 is a rear elevation of the same. Fig. 20 is an enlarged section showing the solder-cutter. Fig. 21 is an elevation of the spray cooling device. Fig. 22 shows the inside soldering device and wiping mechanism. Fig. 23 is a cross-section on line $ww$, Fig. 22, showing a bar soldering-iron. Fig. 24 is a cross-section on line $vv$, Fig. 22, showing a roller soldering-iron. Fig. 25 is a cross-section through the wiper. Fig. 26 is an enlarged side view of the telescopic front end of horn. Fig. 27 is a cross-section of the same on line $ss$, Fig. 26. Fig. 28 is a side elevation of the head and bottom feeding mechanism and also of the swaging apparatus. Fig. 29 is a front elevation of the same. Fig. 30 is a vertical longitudinal section of the can-head-feeding devices. Fig. 31 is a horizontal section on line $tt$, Fig. 28. Fig. 32 is a side view, partly broken away, of the swaging apparatus. Fig. 33 is a front view of the same. Fig. 34 is a perspective view of the front can-head holder. Fig. 35 is a perspective view of the front swaging-plate. Fig. 36 is an elevation, partly broken away, to show the can-head-crimping mechanism. Fig. 37 is a side view of the same. Fig. 38 is a cross-section of the same. Fig. 39 is a section through the male and female dies which form the heads. Fig. 40 is a plan of the female die, showing the slot. Fig. 41 shows the same dies closed and can-head formed. Fig. 42 shows the male die partly drawn back, allowing the formed head to drop through the slot. Fig. 43 is a side elevation of the forward end of the machine with the head-soldering apparatus attached. Fig. 44 is a plan of the same with the turning-gear broken off to show the top of the table with the acid and solder pots, the inclining tracks, and the annular ring holding the can-receivers. Fig. 45 is a side elevation of a can-receiver and part of the annular ring and table, looking toward the center. Fig. 46 is a plan view of the can-receiver. Fig. 47 is a vertical section through the annular ring and table, showing the can-receiver depressed toward the periphery, the can dipped into the soldering-pot, the manner of heating the soldering-pot, and a section of the turning-gear and the inclining track.

A represents the main frame or bed of the machine, supposed to be continuous throughout the lengths of Figs. 1, 2, and 3.

B is the main driving-shaft, having driving-pulleys at one end and a fly-wheel at the other.

C' is a counter-shaft geared down from the driving-shaft by the spur-gears 1 and 2 and extending laterally across the frame. At the end next the fly-wheel the shaft C' has a crank 3, pivoted to the connecting-rod 4, which in turn is hinged at 5 to the side bar C, which extends throughout the machine, and is thus given a reciprocating movement.

I have not shown in the drawings the construction in detail of the mechanism for supplying the can-body blanks. This mechanism is substantially like that shown in an application for patent filed by me March 28, 1894, Serial No. 505,454. In general it consists in a vertical frame A', having a table 6, upon which the flat blanks are piled and from which they are lifted successively by pneumatic cups to the proper position to be placed upon the former or horn D. The lifting motion is imparted by the side bar, which has a depression or incline, bearing upon a roller secured to the vertically-moving frame which carries the lifting devices or suction-cups 7.

The can-body blanks are carried forward by mechanism substantially like that shown in the application referred to, that is, by notched reciprocating carriers, and are delivered upon the former or horn beneath the outside guide-plates 8 and 9. The shape of this horn (which extends throughout the length of the machine) is approximately square in cross-section beneath these plates, tapering down to a cylinder. The can-bodies pushed forward upon this horn and between it and the plates which surround it are gradually pressed into circular shape, but previously have their meeting edges formed into hooks by rollers beneath the plate 8, (shown in dotted lines in Fig. 4,) such hooks being adapted to interlock, and thus form the side seam. These hooked edges are supposed to have been loosely interlocked, and Figs. 8, 9, 10, and 11 show how they are secured or firmly locked together previously to soldering them. Upon a transverse shaft 10 is a cam 11, which receives a rocking motion from the movement of the side bar. This shaft is recessed, Fig. 8, and above it is a cam 12, mounted within a vertically-moving block 13, sliding in guides 14 in the main frame. This block operates the seam-closing dies 21 and 22. The can upon the horn, with its loosely-interlocked edges hooked together, is compressed by the upward movement of the block 13 and the interlocked edges secured tightly together by the dies 21 and 22, the upward thrust being taken by the solid anvil 17, attached to the main frame, thus relieving the horn from upward strain. The upper die 21 is held within a frame 18, set in and supported by a slot in the upper part of the horn below the anvil or thrust-plate 17. The lower die 22 is secured within the block 13, and the horn is of course slotted at the bottom to permit the interior and exterior dies to operate. The edges which form the side seam are compressed and flattened together by the joint operation of the two dies. Blocks 15 and 16 are set in the loose frame 18 and in block 13, respectively, and are provided with shoulders to hold them in place. The springs 19 and 20 force these blocks against the dies 21 and 22, so as to insure the accurate placing of the can-seam between them, the seam being completely inclosed in the space formed by said blocks and dies, as indicated in Fig. 11. After the seam has been closed the can is carried onward to the acid-tank E. The latter is shown in detail in Figs. 13 and 14. The acid is applied to the seam by two-part rollers 23, journaled in a division of the tank and having sponges 24 held between the two parts of the rollers. One part 23 of the roller is loose on its pin, so that it can be taken off for removing and replacing a sponge. I prefer to make these rollers of aluminium, as being non-corrosive, and consequently better adapted to resist the action of the acid. I prefer to make the tank in two compartments 25 and 28, with an opening between them, and to journal the rollers in the smaller one just under the horn. The can is carried forward upon the horn, and the rollers are so situated that the seam is brought into contact with the sponges, any number of which can be used.

After leaving the acid-bath the can-body enters the soldering-tank F. This tank is shown in perspective, partly broken away, in Fig. 15, and in end elevation in Fig. 6. The tank is supported by standards 26 below the horn, Fig. 16, and can be adjusted by screws 27, so that the soldering-iron H shall bear accurately upon the outside of the seam. A hopper 29 receives the solder in the form of wire and delivers it to the bath in regulated quantities by means of a solder-cutting mechanism hereinafter described. Preliminary to such description it is necessary to explain the heating apparatus. The main gas-pipe G extends through the horn and is also utilized as a connecting-rod for transmitting motion to the mechanism which places the heads upon the can. Hence it has a longitudinal movement, which makes it necessary to provide a flexible tube G', Fig. 1, communicating with the gas-pipes which heat the solder-tank at both sides and at its bottom, and which are indicated by 30, 31, and 32. The gas-pipe G is connected by a cross-head $G^2$ to the side bar, and hence receives a reciprocating motion from that bar.

The soldering-iron which I prefer to use is set in the bath and is designated by H. This is a bar-iron of peculiar shape, as shown in Figs. 15 and 17. Its bottom edge is continuous, but its upper edge is recessed so as to form a series of separate irons 33 in line with one another and having a little space between them, which will admit successive bubbles or drops of solder which are smoothed successively along the seam by the irons 33.

Adjacent to the solder-bath is an automatic solder cutter and feeder by which small pieces of solder are cut successively from a ribbon or wire of that material and fed into the bath. It being known just how much solder is required for a seam of a certain length, the cutter is connected and timed so as to cut off just so much solder at each stroke of the side bars. Fig. 2 shows this device relatively to the whole machine, and Figs. 18, 19, and 20 show it in detail.

The spool which carries the solder-wire is secured to some part of the frame convenient to the horn. The ribbon of solder passes down through a fixed guide 34 and between a pair of friction-rollers 35, journaled in such guide. Upon the shafts of these rollers are gears 36, which intermesh and thus move the rollers in opposite directions to carry the solder-ribbon downward for a certain distance. The mechanism which makes this device automatic is connected to the side bar, and is best shown in Fig. 18. A bolt 37 connects the side bar to a slotted crank 38, which derives an oscillatory movement from the reciprocation of the main bar. A link 39 extends from this crank to a lever 40, the upper end of which is mounted upon the shaft of one of the gears 36. A pawl 41 transmits the motion of the lever to the gear-wheels and, of course, to the feed-rollers.

As shown in Fig. 20, a solder-cutter 42 works in a slot below the solder-feed. This knife is fastened to a slide 43, operated by a connecting-rod mounted upon the eccentric part 44 of the shaft 144 of crank 38, so that the eccentric motion gives the sliding motion to the knife. Thus the swing of the crank or arm 38 at each stroke of the side bar feeds the solder-wire down and cuts off a piece of the required length. The pieces of solder cut off fall into a hopper 29.

The seam is cooled by a spray delivered upon it by an atomizer, such as that shown in Fig. 21. A reservoir 45, supported outside the framework, contains water, which by connecting-pipes is conveyed to a nozzle 46, located under the horn. An air-supply pipe 47 is connected to another nozzle 48. Cocks 49 50 regulate the supply of air and water. The can-body having left the solder-tank, the seam as it moves along is exposed to a fine cold spray from the atomizer, which cools it previously to the operation of heading.

Having now described the operation of outside soldering, I refer again to the solder-tank and describe the construction and operation of the inside soldering device, and I refer particularly to Figs. 22, 23, and 24. In Fig. 22 the horn is removed and the inner casting 51, which supports the soldering-iron, is shown in elevation. Referring to Fig. 23, it will be observed that the casting has hollow side passages provided with burner-holes. These passages connect with the gas-pipe and the flame impinges directly upon the iron in contact with the inside seam of the can and which is therefore enabled to spread and distribute the solder which has entered the inside by capillary action through the seam. The casting 51 forms a connection between two sections G of gas-pipe and moves with them.

I have shown two kinds of inside soldering-irons. One is a bar 52 (shown in Fig. 22 as broken away and in Fig. 23) and the other is a roller or rollers 53. (Shown at the right-hand end of Fig. 22 in dotted lines and in Fig. 24.)

Figs. 22 and 25 show the inside wipers 54 to remove any excess of solder. Such wipers may be of any number and are made from any refractory material, such as asbestos, and are secured to a bracket 55, within the horn, through the lower slot of which they project into the path of the can. At this point in the operation we have a completely-formed, seam-closed, and soldered can-body ready to receive its heads.

The heading mechanism comprises machinery for forming the can-heads from flat blanks, for feeding such heads, and for securing them firmly to the ends of the can-body, and such mechanism will be hereinafter described in detail.

The horn is provided with a movable extension or ram D', and the horn and ram are provided, respectively, with projections 56 and 57, that mesh or engage and thus form guides to permit the parts to move independently. The main gas-pipe, which, as before stated, extends entirely through the horn, is secured to the closed forward end of the extension. (See dotted lines in Fig. 26.) It has already been explained how the gas-pipe receives its reciprocating motion. This motion is communicated to the extension, which glides back and forth on its guides. When the extension is closed against the end of the horn, Fig. 3, the two ends register accurately and the cans are carried forward successively upon the extension by the main carriers, the latter terminating at about the middle of the extension, as shown in Fig. 3. The ends of these carriers push the can nearly up to the extreme end of the extension or ram. The movements are so timed that as soon as the can-body has reached the end of the extension the gas-pipe rod is pushed forward, carrying the extension and the forward can-body upon it into the heading mechanism. Latches or stops 58 are pivoted below the extension, (which may be either spring or gravity latches,) over which the successive can-bodies pass, depressing them. They, however, return at once to place, and thereby prevent the retrograde movement of the extension from carrying any one of the can-bodies backward. This extension or ram D' carries the can-body into a heading-chamber D². Spring-stops 59, Figs. 32 and 33, are provided in the rear swaging-ring 64, Figs. 32 and 35, for holding the body in the chamber when the ram moves backward. The chamber D² is provided with vertical passages 60 and 61, into which the can-heads previously formed are fed. In operating the machine the ram D' pushes a can-body into the chamber. As soon as this is done two can-heads are fed through the passages 60 and 61 in line with the can-body in the chamber. At the rear end of the chamber is provided a sectional stop-plate 62, composed of four sections, contained within a frame 63, Fig. 34, which yield to permit the can-body to enter the chamber and then spring back to hold the rear can-head in place. At this point there is an open can-body and two heads ready to be secured to it, and all in position in the chamber D². The next stroke of the ram pushes the rear cover through the swaging-ring 64 and onto the can, and by the same motion propels the can forward and into the front head and then through the front swaging-ring 65, and the complete can into the cylinder D³, which communicates with the crimping apparatus. By one motion of the ram I therefore have both heads in place ready for being crimped or firmly secured to the can-body. Up to this point the can-heads have only been swaged upon the can-bodies; but it is necessary to crimp the top and bottom firmly before soldering them.

The crimping mechanism will be described hereinafter, but before arriving at that point it is necessary to describe a particular mechanism which prevents the can-heads from being fed into the machine unless a can-body is there to fit them. In this connection I refer to Figs. 3, 28, 29, 30, and 31. As the can-heads are fed continuously, it may happen that after a day's run some heads are ready to be fed while no can-bodies are upon the horn. I have provided an automatic device which prevents any can-head from being fed into the heading-chamber before a can-body is there to receive it. It will be readily understood that if can-heads are fed when no can-bodies are upon the horn, or, rather, are being fed into the chamber, the can-heads alone will be driven by the ram against one another. Referring to Figs. 28 and 30, it will be seen that a sliding bolt or cut-off 66, having shoulders 67 68, is adapted to close the passages through which the can-heads are fed down into the heading-chamber, but when moved to open both passages simultaneously and allow two can-heads to drop down into position ready to receive the stroke of the ram. The side bar C, Fig. 28, has a depression 69, and a slot 71 is formed in the top of the chamber. A safety-latch 70, fixed on a rock-shaft 72, Fig. 29, is adapted to project through this slot and rest upon the can-body in the chamber, or if no can-body is in the chamber to rest within a slot 170 in the ram, (dotted lines, Fig. 28.) At the end of the shaft 72 outside the frame is secured an arm 73, to the lower end of which is pivoted a dog 74, which rests upon the side bar. A sliding rod 76 has a stud 77 and is normally held up by the dog. When the dog drops into the depression 69, the arm 76 drops also. This closes the can-head-feeding passages, as shown in Fig. 30, the arm 76 being connected to the cut-off 66 by links 78 and 80, forming a bell-crank on a rock-shaft 79, Fig. 28. Conversely the lifting of the dog 74 at each back stroke of the side bar will open both passages and allow two can-heads to enter the heading-chamber. This is the normal operation of the device when the machine is running, the dog remaining in position below the stud 77. If, however, for any reason the heading-chamber is empty, a spring 75 pulls the dog from under the stud, the action of such spring being no longer restrained by the safety-latch 70, which drops down when the spring 75 pulls the dog 74 from beneath the stud 77. Thus both feed-passages are closed, so that no heads can drop down until the dog 74 is placed under the stud 77 and the rod 76 raised.

Now, referring to Figs. 30 and 31, it will be seen that a lever 81 is pivoted to the sliding bolt by one end and at the other end has a fork 82. This fork is pivoted to a block 83 on a stop-pin 84, the latter alternately projecting into and withdrawing from one of the can-head-feeding slots. A similar stop-pin 85 is held in a sliding frame 86, secured to the block 83, and the reciprocation of this frame moves the two stop-pins into and out of the respective slots through which the can-heads drop. These pins alternately hold and release the can-heads as they drop by entering betwen them, so as to allow only one to fall, while holding up the next.

When a can has had both heads swaged upon it, it is pushed by the next can into crimping mechanism shown in Figs. 3 and 6 and also in Figs. 36, 37, and 38. The crimping device is composed of two flanged rings K K', between and to which is bolted a central ring K², the bolts passing through lugs 87.

L is a pin fixed in a bearing L' on the main frame and secured by a plate L² and nut. Mounted upon this pin is a can-holder composed of two disks M M', Fig. 38, each provided with a series of circular holes 88, placed so as to register. Six of such holes are here shown in each disk, and the two disks are connected rigidly together by bolts 89, Fig. 36.

In each registering pair of such holes is placed a loose hollow cylinder 90, the periphery of which bears upon the edge of these holes, as well as upon the ring K².

N is a loose friction-roller upon the pin L, upon which the cylinders 90 also bear and around and in contact with which they roll. Secured to the flanges of the rings K K' are crimping-rims O, which extend continuously around inside said flanges. It will be understood that the can-bodies with their attached heads are pushed into these cylinders, and, the can-bodies being a little longer than the cylinders, the flanges of the heads are brought into contact with the crimping-rims. As the cylinders carrying the cans roll around the crimping edge or rim creases or crimps the heads upon the body at both ends, the rolling motion of the cylinders causing every part of the can-head to be subjected to the crimping pressure, which secures both heads firmly to the body.

The rolling motion of the cylinders is imparted by the disks which hold them. A boss 91 is loose on the pin L and carries a swinging arm 92, Fig. 36. The disk M' has a series of notches 93, and the arm 92 has a pawl 94, which engages with them successively. Thus at each stroke of the arm the disks M M' are moved forward the space between two notches and each cylinder is caused to roll the same distance. As the pawl returns to seize the next notch a can is discharged and another fed into the empty cylinder. I design to feed and discharge the cans at the top of the crimper, and hence the flanges of the outer disks, and also the plates L² and 91, must be cut away a little, as shown at 95, Fig. 36, and also in Fig. 7, to allow the cans to pass. The flanged rings K K', washer L², and boss 91 and crimping rims or edges O keep the cans in place and prevent them from coming out, except at the top, where these rings are cut out sufficiently, as just stated. As each cylinder arrives at the top in line with the ram a can is pushed in from behind, driving out the crimped can. A spring-rod 96 acts as a stop to place each cylinder accurately in line by dropping into notches on the disk M, corresponding to those on the ring M', already described.

The arm 92 is given its oscillating motion by the side bar C. To a connecting-rod 215, pivoted near the end of this bar, is connected a bell-crank 97, to one angle of which is pivoted a link 98. This link is connected to a slide 99, working vertically and carried upon a guide-rod 100, moving in brackets 101', Fig. 3, the horizontal motion of the side bar being by these connections converted into a vertical motion for the slide. The slide is pivoted to the end of the arm 92 by means of a pin 112 on said arm, which works in a slot 113 on slide 99.

I have thus far assumed that the can-heads are supplied to the machine, whether automatically or by attendants. I now describe an automatic mechanism which not only delivers the heads to the heading mechanism, but also forms such heads for delivery. Such mechanism is represented in Fig. 7 in a general perspective and in Figs. 39, 40, 41, and 42.

Referring to Fig. 7, it will be seen that two presses P and Q are provided adjacent to the front end of the machine, one at each side. These presses carry male and female dies, the former being driven by any suitable gearing, such as a belt to the fly-wheel on shaft 101. The movable or male die R is driven by a crank in the manner usual in power-presses, and such shaft is provided with any suitable kind of clutch for engaging and releasing the driving means. These clutches are shown as being automatically controlled by the arm 76 of the heading mechanism before described. The lower end of this arm has a pin 115, to which is connected a rod 114, Fig. 29. This rod extends downward, and its lower end is connected to rock-shafts which, through any suitable connection, impart the requisite sliding motion to the clutches. Therefore by the upward movement of rod 76, that is to say, at each backward stroke of the side bar, the clutches are engaged and the presses operated, forming two can-heads.

Certain improvements in the construction of the forming-dies will be described in detail hereinafter. I assume for the present that can-heads will be formed in both presses simultaneously from the long blanks piled in the holders 102 on top of the presses. These blanks are fed to the dies by pneumatic cups 103, and such blanks are moved forward by a screw 107, which forces the holder 102 for the blanks toward the suction-cups 103, the motion of both being transmitted through the lever 104 and cam 105, the said cam deriving its motion from the shaft of the pulley 106 by means of belt or other gearing. The screw receives its motion directly through a ratchet and pawl and miter-gears, as shown, or in any other suitable way. The pressed can-heads delivered from the presses roll down a chute 108 and are delivered to the elevator-belts S. These elevators, one on each side, consist of elevator-frames 109, connecting the chutes 108 with chute U. Each head as it leaves the chute 108 and enters the elevator is caught by one of a series of pins 110 on the endless belt S, placed near one edge thereof. The heads are thus carried up by the belts and guided by the frames 109 until they reach the inclined chutes U. The belt goes on, but the can-head strikes the top of the chute U and rolls over into it and the supporting-pin, being placed at one side of the center line of such head, aids in turning it into the chute. The heads roll down these chutes and simultaneously enter the heading mechanism, the operation of which has been fully described. The belts are driven by overhead shafts, set in motion by the shafts 101, which drive the presses.

I now refer to Figs. 39, 40, 41, and 42, which show in detail the construction of the can-head-forming dies. This construction is particularly adapted to a machine of this character, in which at each stroke of the side bar a can-body is formed, both can-heads delivered, both can-heads secured, and a complete can discharged; and such a construction is particularly desirable where can-heads are to be automatically delivered by belts or elevators or in any other way to the heading devices. It is important to provide forming-dies which are adapted to make and discharge can-heads rapidly and successively into the feeding mechanism and in proper position to be carried to the heading mechanism.

The male die R is secured in the usual manner to the cross-head of the press and reciprocates with it. This cross-head is not shown in the detail views, as its construction is well known, but is indicated in Fig. 7 on the press. The male die is recessed, so as to provide a circular cutting edge 116, adjacent to which, inside the recess, is the crimping or flanging surface 117, adapted to act in connection with a similar surface in the female die V. Within the recess is an independent circular plate 118, upon which bear springs 119, which tend to force it constantly toward the female die. The plate is secured to a guide-rod 120, which passes through the male die.

The female die V is stationary in the press, and its back or bed plate is represented by 121. The die is composed of a steel block 122 and a plate 123, bolted to the bed-plate and recessed, so as to receive the block 122 between it and the plate 123, which receives the male die, such recess being shaped so as to coöperate with the male die in flanging the head and in providing the surface of the latter with the inner bevel and also with the panels with which can-heads are now usually provided. A face-plate 124 is secured to the plate 123 and is provided with a cutting edge 125. The plate 123 is cut away, so that between it and the plate 124 is formed a slot 126, opening downward. This is the discharge-slot for finished heads, and communicates with the chute and elevator shown in Fig. 7. The male die being retracted, one of the blanks or sheets shown in Fig. 7 is fed down into the press until its lower edge rests upon a small spring 127, Fig. 39. The forward stroke of the die R cuts out a flat circular blank from the sheet and pushes it into the female die until it strikes against a circular ring 132, secured to pins 129. These pins pass through holes in the back plate and bear upon the yielding plate 130, behind which is a spring-buffer 131. One purpose of the ring 132 is, in connection with the plate 118, to hold the blank in place before and while the flanging is done, so that the flange of the can-head may be made perfectly accurate. The male die continues to advance, the ring and pins yield, and the blank is pushed between the forming-surfaces of the two dies, where the flange is made and the inner bevel, &c., formed. When the male die recedes, the plate 118, which has been driven into its recess, Fig. 41, is driven out by its compressed springs 119 and forces the finished head out of the forming-recess 117, and the annular ring 132, following by pressure of spring 131, pushes such head out of the female part of the die and into line with the slot 126, through which it drops into the chute 108, from which it is delivered by the elevator and chutes U into the heading device, as before described.

The large blanks or sheets, as previously stated, are fed by a special device to the presses; and these blanks, being strips of substantially the width of a can-head, but of greater length, (so as to form several heads from each of said blanks,) it is necessary to provide a device by means of which the blanks can drop down and be held in place after one can-head blank has been cut, and thereby be ready for the cutting of the next can-head blank. This device consists in a spring-bolt 128, attached to the male die and entering the cross-head, and the flat spring 127, the end of which is turned at right angles, as shown at 133, to receive the lower edge of the sheet. When the dies are closed together, the bolt 128 pushes the spring 127 back. When the dies commence to separate, the sheet drops upon the bolt 128, and when the male die has receded still farther the flat part of the spring 127 enters the hole left in the sheet where the last blank was cut out, and consequently the sheet drops down the diameter of the circular blank, and its lower edge rests on the spring, as before, ready for the next operation of the press.

The principal feature in this press is the discharge-slot inside the female die; and it is evident that this slot may extend across the whole face of the die, as shown in dotted lines in Figs. 40, 41, and 42. This will enable me to push out any blank which may have lodged in the female die and also to use a ram or slide for positively discharging the blanks, either in a horizontal or an upright press.

The last step in the manufacture of my cans is the soldering of the heads after the crimping operation has been completed. The head-soldering mechanism, operated by the side bar C, is illustrated in Figs. 43 to 47, inclusive. It is not shown in the perspective, Fig. 7, because it would obscure the illustration of the crimping mechanism. By reference to Figs. 43 and 44 its relation to the crimper will be easily understood.

Each can having its head crimped is pushed out of the crimper, as before described, into a tube $D^4$, in line with one of the can-receivers forming part of the head-soldering machine.

W is a table which is secured to the main frame of the machine and forms a continuation of it. On the table are secured stationary guide-tracks 135 136, hereinafter more fully described.

W' is a vertical shaft or pin fixed centrally in the table. Loosely mounted upon this pin is an annular ring $W^2$, having upon its inner periphery a series of notches 137. This ring rests upon a series of rollers journaled in lugs on the table, one of which is shown in Fig. 45; and the ring is intermittently moved by lever 138, mounted upon the pin W', from which lever a connecting-rod 139 extends to the lever 140, pivoted to the main frame. A rod 141 connects this lever to the bell-crank 97, before described in connection with the crimper. The lever 138 has a pawl 142, which engages with the notches 137 successively, so that at each backward motion of the side bar C the ring $W^2$ is moved forward the distance between two of the notches, while during the forward stroke of said side bar the ring is stationary until the pawl 142 engages with the next notch. The ring revolves between the tracks 135 136, Figs. 44 and 47, and is connected with a central hub or sleeve 143 by spokes above the guide-tracks. At the end of each spoke are double lugs 145, slightly inclined to the radius of the ring, so that two adjacent lugs of any two spokes will be parallel to one another. In each lug is formed a bearing 146 for the trunnions of the can-receivers $W^3$, a series of which, with cans in place, are shown in Fig. 43. The details of these can-receivers are shown in Figs. 45, 46, and 47. A slotted outer shell 147, having open ends, is provided with slotted lugs 148, having the trunnions 149. The latter rest in the bearings 146, while the outer shell rests upon the guide-tracks, Fig. 47. The can-receiver being thus secured to the ring $W^2$ moves with such ring at each backward motion of the side bar C. Within the shell 147 is an open-ended cylinder 150, fitting loosely, so as to rotate within the shell. This inner cylinder is the actual can-receiver. When in the position shown in Fig. 44, a can discharged from the crimper is pushed into the cylinder. The can is a little longer than the cylinder, so that both heads project beyond the open ends of the latter to enable the solder to be applied. Secured to the inner cylinder 150 is a gear-wheel 151, which projects through the outer shell 147, and the slotted lugs 148. With this pinion engages a large gear $W^5$, mounted loosely on the center-pin and driven by connections hereinafter described, which by its rotation gives a rotary motion to all the inner can-receivers simultaneously. I thus provide for the three motions of the can-receivers; first, the step-by-step motion around the table by the rotation of the supporting-ring, which carries them; secondly, a tilting motion of both cylinders on the trunnions, by which each head is separately dipped into a solder-trough, and, third, a continuous rotary motion of the inner cylinder, by which the can is caused to roll in the solder, so that the latter is supplied around the entire circumference at the joint between the can-body and can-head. The tilting motion is produced by the bearing of the can-receivers upon the upper edge of the inner and outer tracks 135 136, which, relatively to one another, are either of the same height or of varying heights, according to the position which the can must assume at any particular stage of the operation. Taking, for instance, the can-receiver shown in Fig. 44, into which a can has just been pushed from the crimper, at that point the edges of the tracks are in the same horizontal plane, and the receiver is also horizontal. When the carrying-ring makes its forward movement, the inner end of the can-receiver rides up an incline on the inner track, while the outer end is correspondingly depressed to the acid-tank 152, the rollers of which supply the flux to the joint, the can being rotated in contact with such rollers by the gearing described. The outer soldering-trough 153 has a slot in its top, Fig. 47, and its inner edge may form a part of the track 136, as shown in that figure. The relative heights of the two tracks is such that the edge of the can is depressed into the trough at such an angle that the solder enters the joint partly by its gravity and partly by capillary action, and is applied around the whole circumference by the rotation of the can-receiving cylinder. A gas-pipe 154 is connected to the main gas-supply of the machine and has a branch 155 beneath the solder-trough, Fig. 47. After the solder has been applied the can, still inclined outward, is carried over rollers in a warm-water bath 156, which partly cools the joint. The bath can be sufficiently warmed by burners 157 at one side in the gas-pipe 154. The can is now ready to be tilted in the opposite direction to solder the other head, and the successive steps and the means for carrying them out are precisely the same as those just described. The outer track 136 is now the raised track, and the can is tilted inwardly to a second acid-bath, soldering-trough, and water-bath, all of which, as well as the gas-pipe, are in proximity to the inner track instead of the outer. Fig. 43 shows very clearly the can-receivers tilted inwardly. When any particular can-receiver of the series arrives opposite the tube $D^4$, its can is pushed out by an incoming can discharged from the crimper and falls through an opening 158 in the table into a chute 159. The can is now completely finished.

It has been stated that during the operations of fluxing, soldering, and cooling the cans have been rotated at proper times by the gears $W^5$ and 151. The gear $W^5$ rotates in a direction opposite to that of the carrying-ring $W^2$, arrow Fig. 44, and is moved positively by a pawl 160 on an arm 161, secured to the hub of said gear, the outer edge of the gear having notches 162, with which said pawl engages successively. The arm 161 is connected to the upper end of lever 140 by a rod 163. Thus the gear $W^5$ is moved and rotates the can at each forward stroke of the side bar, and while the ring $W^2$ is stationary and holding the can in either of the baths or troughs, and is itself stationary at the backward stroke, or while the ring $W^2$ is carrying the cans from one mechanism to the next. As shown in Fig. 47, the teeth of the gear $W^5$ are formed on the arcs of a circle, so as to allow the can-receivers to tilt and to engage and rotate the can-receivers, no matter what their inclination from the horizontal may be. The can-receiving cylinders 150 are continuously rotated in the same direction by the alternate movements of the gear $W^5$ and the ring $W^2$, the intermittent motion of the ring causing the gear 151 to turn while the gear $W^5$ is stationary and the gear $W^5$ causing the gear 151 to turn while the ring $W^2$ is stationary.

While I have shown this head-soldering mechanism as adapted to cans in which two heads are firmly secured to the body, it will be understood that in the case of cans having one loose head or removable cover only one set of fluxing and soldering devices need be used.

It is also evident that by slight modification and changing the shape of the can-receiving cylinders to accommodate cans of rectangular or other polygonal cross-section the head-soldering mechanism described can be adapted to solder one or both heads upon cans of that character as well as cylindrical cans.

What I claim is—

1. In an organized machine for making cans and in combination, can-body-forming mechanism, can-heading mechanism, can-head-soldering mechanism, means for propelling can-bodies to the heading mechanism, means for discharging cans from the heading mechanism and into the soldering mechanism, and connected mechanical devices for operating the several parts of the machine, substantially as set forth.

2. In combination with a former or horn and carriers for impelling can-bodies successively along such horn, a heading mechanism, and a movable ram or extension to the horn for placing can-bodies within and driving them through the heading mechanism, substantially as set forth.

3. A machine for making cans, consisting of can-body-forming mechanism, can-head-forming mechanism, can-head-feeding mechanism, can-heading mechanism, and connections between all of said mechanisms, whereby can-bodies after being formed are headed simultaneously at both ends, substantially as described.

4. An automatic can-making machine consisting of a can-body-forming mechanism, can-heading mechanism, and can-head-soldering mechanism, such mechanisms being arranged longitudinally in line so as to operate successively upon each can, and a reciprocating driving-bar connected to each of such mechanisms.

5. In an automatic can-making machine, and in combination, a horn or former for can-bodies, side seaming and soldering devices, a can-heading chamber in line with such former, a crimper for crimping the can-head flanges upon the can-bodies and having receiving and discharge openings in line with the heading-chamber, and a can-head-soldering mechanism, in line with the crimper and receiving the headed cans directly from said crimper, substantially as described.

6. In an automatic machine for making complete cans from flat blanks by a continuous operation, and in combination, a horn or former for can-bodies, a chamber provided with heading mechanism, mechanism for forming can-heads from flat blanks, chutes connected to said can-head-forming mechanism and to said heading-chamber for delivering can-heads to such chamber in line with the can-bodies, a crimper for crimping the can-head flanges upon the can-bodies and having receiving and discharge openings in line with the heading-chamber, a can-head-soldering mechanism in line with the crimper, and driving mechanism, substantially as described.

7. In a can-making machine, the combination with the horn or former, adapted to hold a can-body, of a frame within the former carrying a stationary die, a vertically-moving block beneath said former and carrying the lower die, a reciprocating side rod, a shaft carrying an oscillating arm connected to said side rod, and a cam on said shaft for giving the vertical motion to said block and lower die, substantially as described.

8. In combination with a hollow slotted horn or former, an independent frame in said slot supported by the horn, in combination with side-seaming dies, and with a thrust-plate in line with said frame, whereby the strain in side-seaming is taken by said frame and thrust-plate, substantially as described.

9. In a can-making machine, the combination with a hollow horn or former having upper and lower slots in line, of a frame supported in the upper slot and coinciding with the adjacent external configuration of the horn, a seaming-die carried by said frame, a thrust-plate above said frame, and a movable seaming-die below the former, substantially as described.

10. In a can-making machine, the combination with a hollow horn or former, of a frame held in slots in the horn and carrying a seaming-die, a vertically-sliding block beneath the horn carrying the other seaming-die, yielding blocks in said frame and in said block for bearing on the edges of the seam during compression, and a rigid thrust-plate above said frame, substantially as described.

11. The combination with the solder-tank, of a soldering-iron, set in the tank and composed of a flat bar, cut away at intervals entirely through its thickness, whereby integral soldering projections are produced, entirely separated from each other as to their working surfaces, substantially as set forth.

12. In a can-making machine, and in combination with the soldering-tank, a solder-cutter, comprising a sliding knife, a shaft having an eccentric connected to said knife, a swinging arm on said shaft, connected to the reciprocating side bar of the machine, feed-rollers for solder-wire, intermeshing gears in the shafts of said rollers, and connections between said swinging arm and said gears, whereby the solder is fed and cut at each forward stroke of the side bar, substantially as set forth.

13. In a can-making machine, the combination with a forming-horn, and with seam-soldering mechanism, of separate air and water supply pipes having adjacent nozzles in proximity to the horn, forming a spray or atomizer for cooling the side seam, substantially as described.

14. In a can-making machine, the combination with the tubular slotted horn, of a frame supported within the horn and having gas-passages and burner-orifices, a gas-pipe connected to said frame and one or more inside-soldering irons secured to said frame independently of the horn, substantially as described.

15. In a can-making machine, the combination with the tubular slotted horn, of a movable frame within the horn, having gas-passages and burner-holes, one or more soldering-irons secured to said frame, and means for reciprocating said frame and soldering-irons, substantially as described.

16. In a can-making machine, the combination with the horn or former, of an independent movable extension thereof, forming a ram, and a combined gas-supply pipe and connecting-rod for operating said extension, substantially as set forth.

17. In a can-making machine, the combination with the horn or former and the reciprocating side bar, of an independently-movable extension of said horn forming a ram, a combined gas-pipe and connecting-rod for transmitting motion to said extension, connected to said side bar, and having a flexible section, whereby it is permitted to reciprocate, substantially as set forth.

18. In a can-making machine, and in combination, the hollow horn or former having an independently-movable extension or ram, a reciprocating two-part gas-supply pipe connected to said ram, a reciprocating side bar connected to said pipe, and a movable inside-soldering device within the horn connected to both parts of said gas-pipe, and having gas-passages, substantially as set forth.

19. Can-heading apparatus consisting of a chamber, open at both ends and having means for supporting a can-body and two can-heads in line, a single plunger, and means for causing said plunger to enter and traverse said chamber, whereby at a single stroke, one head is pushed upon the body, the body is pushed into the other head, and the body with both heads is pushed out of the unobstructed end of the chamber, substantially as described.

20. In a can-making machine, a heading-chamber, having heading-rings, and adapted to contain a can-body, and two can-heads in line with the same, in combination with a ram, adapted to enter said chamber and by a single stroke to head both ends of the can and drive it out of the chamber, substantially as described.

21. In combination with a can-body former and with a heading-chamber and heading devices, a movable extension of the former for carrying can-bodies into said heading-chamber, and yielding latches for holding said can-bodies from backward movement while on the extension, substantially as described.

22. In a can-making machine, a heading-chamber adapted to receive a can-body and having slots or passages for receiving two can-heads, one at each end, in combination with heading-rings, and with a reciprocating ram for forcing a can-body into said chamber and for forcing said can-body and heads through said chamber and heading-rings, substantially as described.

23. In a can-making machine, the combination with the heading-chamber, of a telescopic forming-horn for placing can-bodies in such chamber, passages for admitting can-heads, and a yielding stop-plate at the inlet end of such chamber for preventing the withdrawal, with the horn, of the can-bodies, substantially as described.

24. In combination with the heading-chamber, the forming-horn having a movable extension for carrying can-bodies into such chamber, and the frame 63, secured within such chamber, and having the sectional stop-plate 62, substantially as and for the purposes set forth.

25. In combination with the heading-chamber, and the reciprocating ram, passages for admitting can-heads to said chamber and beveled rings at opposite ends of the chamber for swaging both heads upon the can-body at one stroke of said ram substantially as set forth.

26. A heading-chamber having interior heading mechanism and forming a support for two can-heads, and for a can-body, in combination with a reciprocating ram adapted to enter said chamber and place a can-body in position for heading, and by the same movement to force the preceding can-body and heads through the said heading mechanism, and out of said chamber, substantially as described.

27. In combination with the heading-chamber and with the reciprocating ram adapted to enter said chamber and place can-bodies therein, a swaging-ring in said chamber having the yielding latches 59, substantially as and for the purposes set forth.

28. In combination with the heading-chamber having a passage or slot at each end for holding a can-head, chutes for supplying can-heads to both passages, a sliding cut-off for alternately and simultaneously opening and closing said passages, a reciprocating side bar and connections from said side bar to said cut-off, substantially as described.

29. In combination with a hollow heading-chamber adapted to receive can-bodies, the reciprocating side bar having a depression in its upper edge, a pivoted dog resting upon said side bar, can-head-feeding chutes communicating with passages or slots at the ends of the chamber, a sliding cut-off for both passages and a rod connected to said cut-off, and bearing on said dog, whereby at each forward stroke of the side bar, the passages are closed and at each backward stroke of the same, are opened to admit two can-heads simultaneously.

30. In a heading mechanism for cans, and in combination, a heading-chamber having a slot; a reciprocating side bar; can-body-feeding mechanism; can-head chutes communicating with said chamber; a cut-off for alternately opening and closing said chutes; a dog operated by the side bar for controlling the movement of said cut-off; and a latch projecting through the slot in the chamber and connected to said dog; whereby, when no can-body is in the chamber, said latch falls, said dog is disengaged, and the can-head chutes are closed, substantially as described.

31. In combination with the heading-chamber, and can-head-feeding chutes, a sliding cut-off between said chamber and said chutes, and stop-pins connected together, and to said cut-off for alternately retaining and releasing each can-head in each chute, substantially as set forth.

32. In combination with the heading mechanism, the can-head-feeding chutes, the sliding cut-off 66, a movable frame or cross-head, carrying stop-pins 84, 85, and a connection between said frame and cut-off, substantially as and for the purposes set forth.

33. A device for crimping can-head flanges upon can-bodies, consisting of a series of revolving and rotating cylinders from which the ends of the cans project, in combination with a circular crimping-rim adapted to bear upon the can-heads in said cylinders, substantially as described.

34. A crimping device for crimping can-head flanges upon can-bodies consisting of a fixed frame having crimping edges, a loose center roller within said frame, and tubular can-holding chambers, having axial rotation and revolution around said center roller, substantially as described.

35. A device for crimping can-head flanges upon can-bodies, consisting of a series of can-holding cylinders, means for revolving said cylinders step by step around a center of revolution, means for independently rotating said cylinders and fixed crimping-rims adapted to bear upon the can-head flanges, substantially as described.

36. In combination with can-body-forming and can-heading mechanism, a circular crimping-frame, having continuous stationary crimping edges secured within it, an inner drum or barrel, means for intermittently revolving said barrel, a central friction-roller, and can-holding cylinders carried by said barrel, in contact with the central roller and with the circular crimping-frame, substantially as set forth.

37. In a can-making machine, the combination with the reciprocating side bar C of a rotary crimper, for crimping can-head flanges upon can-bodies consisting of intermittently traveling and rotating can-holding cylinders, circular fixed crimping-rims, concentric with the line of travel of said cylinders, and connections from the side bar, for causing the intermittent revolution of said cylinders, substantially as set forth.

38. In combination with the reciprocating side bar C, the stationary crimping-frame, a skeleton drum composed of two disks having openings in line for supporting can-holding cylinders, a series of notches in the edge of one of such disks, a swinging arm carrying a pawl and connections between said arm and said bar, whereby the reciprocation of the side bar transmits an intermittent motion to the drum and can-holding cylinder, substantially as set forth.

39. In combination, to form a device for crimping can-head flanges upon can-bodies, the outside stationary crimping-frame having circular crimping-rims, the movable inner disks M, M', having openings in line, a central shaft or pin, a friction-wheel upon said pin, and can-holding cylinders supported by said movable disks in contact with said friction-wheel and with the outside frame, substantially as set forth.

40. In combination with the stationary crimping-frame and crimping edges having openings for receiving and discharging cans, a notched carrier for can-holding cylinders, means for causing said carrier to travel intermittently within said crimping-frame, and a spring-bolt in said frame adapted to engage with the said notches successively, substantially as and for the purposes set forth.

41. In can-making machinery, mechanism for soldering can-heads to can-bodies, consisting of a series of rotating and traveling can-receivers or tubes from which the ends of the cans project, in combination with a soldering-trough, substantially as described.

42. In can-making machinery, mechanism for soldering can-heads to can-bodies consisting of a separate solder-trough for applying solder to each can-head, in combination with a series of rotating, traveling and tilting tubular can-receivers, and mechanism for imparting said rotary, traveling, and tilting movements to said can-receivers, substantially as described.

43. In a can-making machine, and in combination with can-body-forming, and can-head-attaching mechanism, a series of rotating, traveling, and tilting can-receivers, means for bringing such receivers successively into line with the heading mechanism to receive headed cans, and soldering devices in the line of travel of said receivers, substantially as described.

44. In a can-head-soldering mechanism, a carrying-ring, means for giving said ring an intermittent motion, tilting can-receivers mounted in said ring and each composed of a pivoted outer shell containing a rotary inner cylinder, and inner and outer concentric guide-tracks for said can-receivers, substantially as described.

45. In combination with an intermittently-moving carrying-ring, a series of can-receivers, each composed of an outer cylinder having trunnions mounted in said carrying-ring, and an inner cylinder having a peripheral gear extending through the outer cylinder and a centrally-mounted and intermittently-driven gear engaging with the gears throughout the series of can-receivers, all constructed and arranged so that said can-receivers derive an intermittent revolution, and their inner cylinders a continuous rotation, substantially as set forth.

46. In a can-making machine and in combination, a can-body former, a can heading and crimping device, a reciprocating side bar, a rotary head-soldering mechanism in line with the crimping device so as to receive the headed cans successively and directly from said crimper and connections from the side bar for operating the head-soldering mechanism, substantially as set forth.

47. In a can-head-soldering machine, and in combination, a device for applying solder, a carrying-ring having an intermittent or step-by-step motion, a series of can-holders mounted in said ring, each having a peripheral gear, a driving-gear engaging with all the gears of the said can-holders, and having an intermittent motion in the opposite direction to that of said ring and while said ring is stationary; whereby the can-holders are continuously rotated in the same direction substantially as described.

48. In a can-soldering machine, a table, an intermittingly-rotating ring or carrier, a series of two-part can-receivers, one part being an outer shell mounted in the ring so as to tilt, and the other and inner cylinder loose in the outer shell and adapted to hold a can-body, concentric guide-tracks for alternately tilting said can-receivers, away from and toward the center of said ring, and separate soldering-troughs arranged relatively to the ring so as to apply solder to both heads, substantially as set forth.

49. In a can-making machine, and in combination with can-body-forming and can-heading mechanisms, dies for forming can-heads from flat blanks, and a discharge-passage from said dies communicating with said heading mechanism, substantially as described.

50. In a can-making machine, and in combination with can-body-forming and can-heading mechanisms, dies for forming can-heads from flat blanks, chutes for supplying such can-heads to the heading mechanism, and a passage from said dies communicating with said chutes, substantially as described.

51. In can-making machinery, a stationary die and a movable die for pressing can-heads, a feeding-passage for delivering blanks to said dies, and a discharge-passage for the pressed can-heads, both passages being arranged substantially at right angles to the line of movement of the movable die, substantially as set forth.

52. In a can-making machine, the combination with the fixed female die having a closed rear end, a pressing-recess and a discharge passage or slot, a male die having a recessed face, and a yielding plate in said recess adapted to bear against the female die while the male die is in the pressing-recess, and to remain in contact with the female die until the male die is disengaged from such recess, substantially as and for the purposes set forth.

53. In a can-making machine, a press for forming can-heads, a holder adapted to contain a supply of blanks, adhesive cups for withdrawing such blanks singly and successively, and a passage between the dies of the press having a movable support for the lower edges of such blanks, substantially as described.

54. In combination with can-body-forming and can-heading mechanisms, presses for forming can-heads, operated through movable clutch mechanism, chutes for delivering such can-heads to the heading mechanism, a cut-off for controlling the feeding of the can-heads to said heading mechanism and connections between said cut-off and said clutch mechanisms, substantially as described.

55. In a can-making machine, the combination with the fixed female die having a closed rear end, a pressing-recess and a discharge-passage, of yielding pins in said pressing-recess and a movable die adapted to enter said recess, substantially as described.

56. In combination with can-heading mechanism, die-presses for forming can-heads, chutes for feeding such can-heads into the heading mechanism, cut-offs in said chutes for regulating the feed of such can-heads, and endless carriers or elevators for transferring the can-heads from the presses to said chutes, substantially as described.

In testimony whereof I have affixed my signature, in presence of two witnesses, this 13th day of October, 1894.

ROBERT D. HUME.

Witnesses:
L. W. SEELY,
JAMES L. KING.